United States Patent [19]

Carr et al.

[11] 4,273,839
[45] Jun. 16, 1981

[54] ACTIVATING CARBONACEOUS ELECTRODES

[75] Inventors: Peter Carr, Utica; Alfred F. Laethem, Sterling Heights, both of Mich.

[73] Assignee: Energy Development Associates, Inc., Madison Heights, Mich.

[21] Appl. No.: 62,108

[22] Filed: Jul. 30, 1979

[51] Int. Cl.³ ............................................. H01M 2/38
[52] U.S. Cl. ...................................... 429/51; 429/199; 204/2.1
[58] Field of Search ................... 429/51, 50, 218, 199, 429/229; 204/2.1, 294, 129, 101

[56] References Cited

U.S. PATENT DOCUMENTS

| | | | |
|---|---|---|---|
| 1,954,674 | 4/1934 | Loger | 204/101 |
| 2,070,612 | 2/1937 | Niederreither | 429/51 X |
| 3,236,760 | 2/1966 | Messner | 204/129 |
| 3,809,578 | 5/1974 | Symons | 429/51 X |
| 3,813,301 | 5/1974 | Carr | 429/50 |
| 4,043,881 | 8/1977 | Yen et al. | 204/101 X |
| 4,113,924 | 9/1978 | Kantner | 429/50 |
| 4,120,774 | 10/1978 | Hart | 204/294 |
| 4,124,741 | 11/1978 | Hart | 204/129 X |

*Primary Examiner*—Charles F. LeFevour
*Attorney, Agent, or Firm*—Burton, Parker & Schramm

[57] ABSTRACT

Described is a method of activating a carbonaceous electrode comprising the steps;

1. Providing a negative electrode and a carbonaceous positive electrode spaced apart from each other;
2. Providing an aqueous electrolyte with a current carrying water soluble material therein; and
3. Closing the circuit and passing a current between the positive and negative electrodes through the electrolyte thereby generating oxygen for a period of time sufficient to activate the positive electrode.

The electrodes are useful in a metal halogen electrical energy storage device.

19 Claims, 9 Drawing Figures

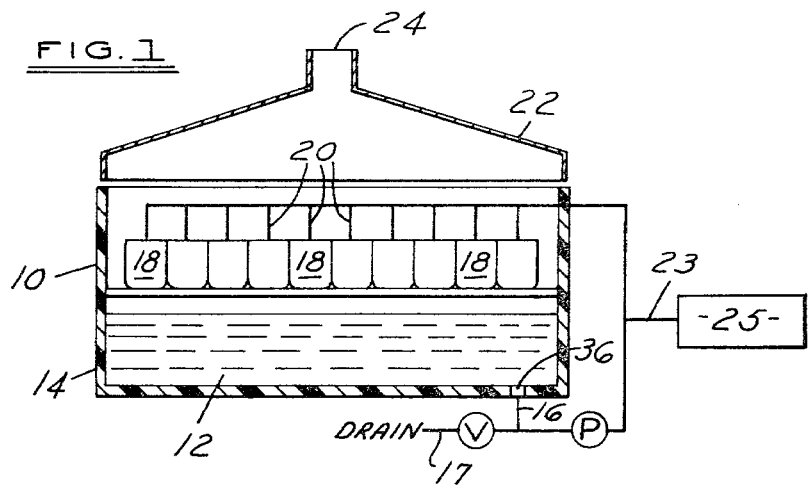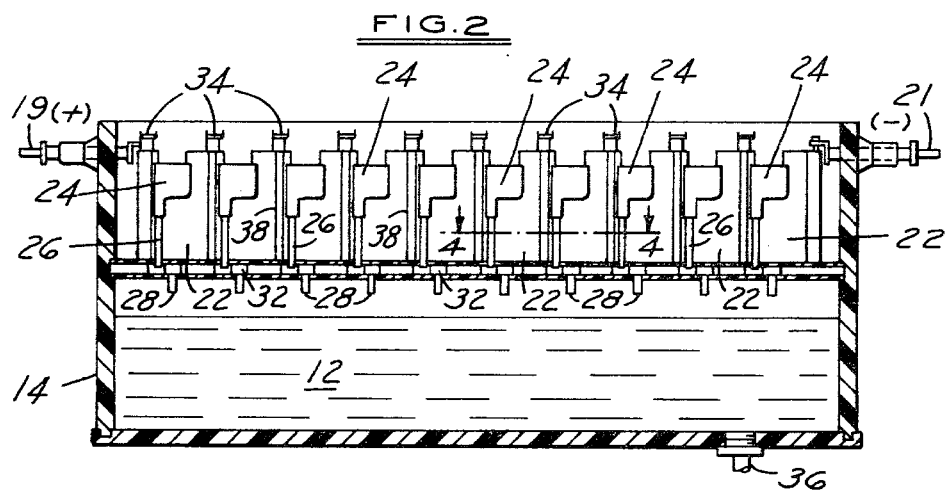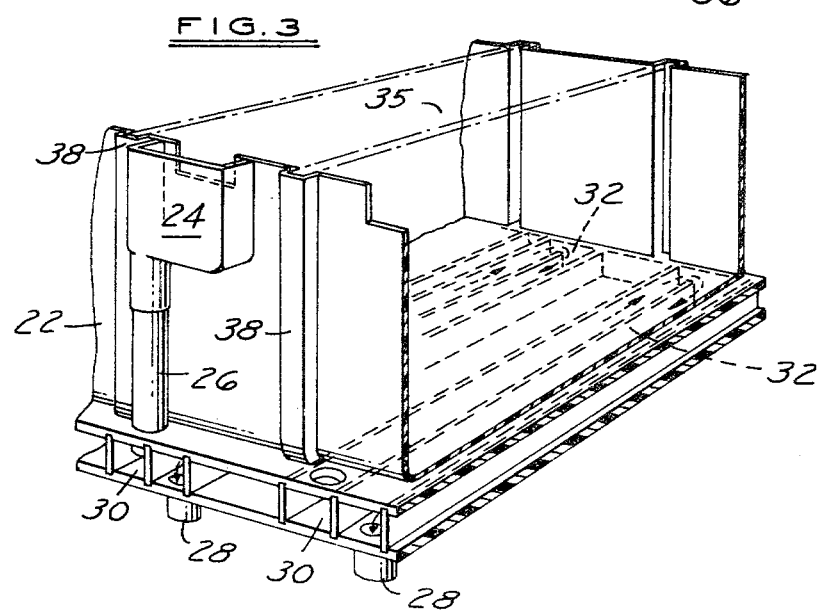

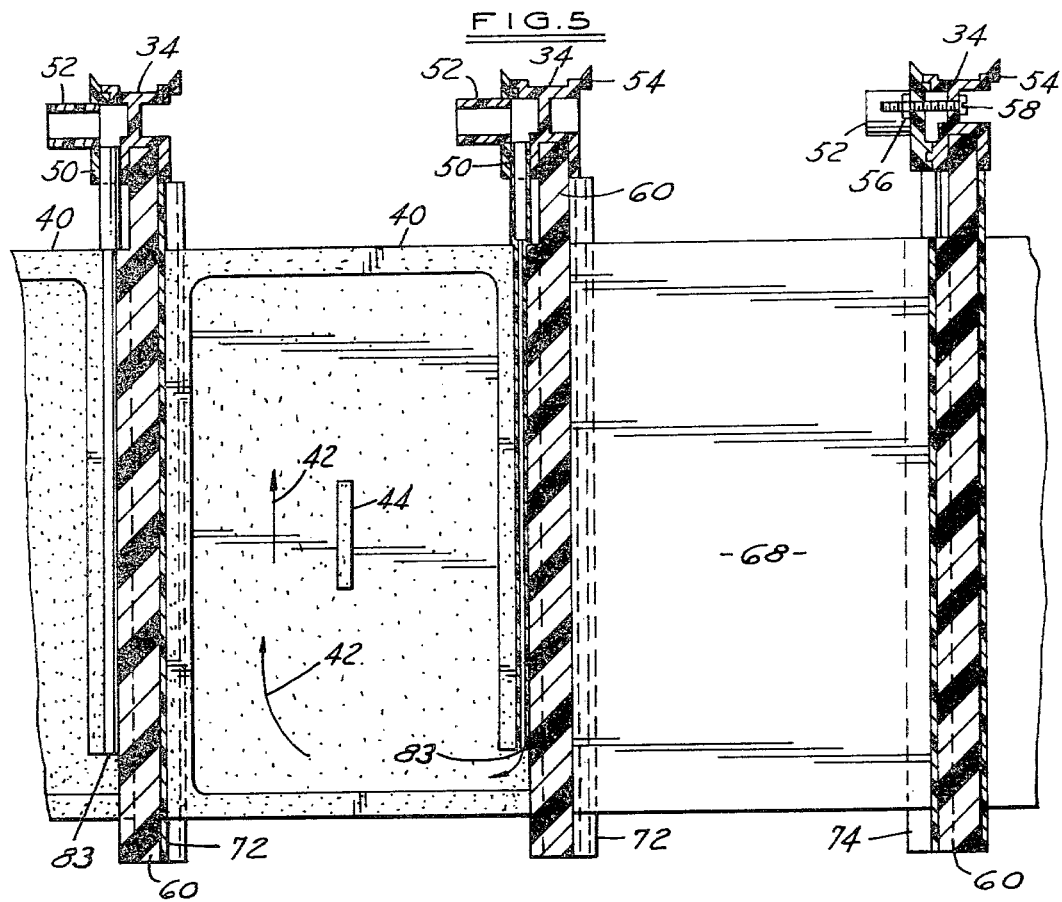
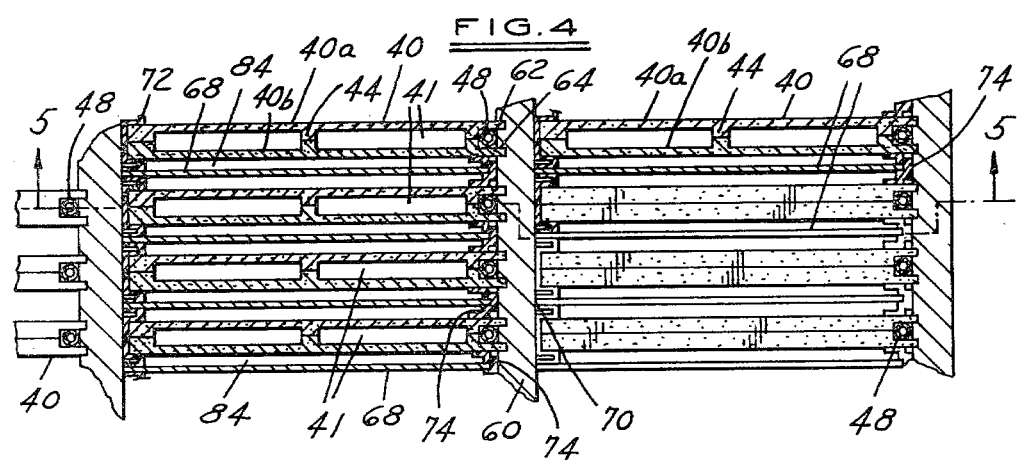

ACTIVATING CARBONACEOUS ELECTRODES

BACKGROUND OF THE INVENTION

In electrochemical processes, it is highly desirable that the reactions occur as near as possible to the theoretical open circuit voltage. Any means of activating an electrode to improve the operation of the electrode is highly desirable in any and all electrochemical processes, particularly as they relate to electrical energy storage devices (EESD). One process for improving electrode activity is described in U.S. Ser. No. 761,722 filed Jan. 24, 1977, entitled REDUCTION OF ELECTRODE OVERVOLTAGE, now U.S. Pat. No. 4,120,774. This patent employs a thermal treatment of electrodes with nitric acid for a long period of time to achieve satisfactory activation. Thermal treatment with nitric acid of electrodes may require that the electrodes be handled in a separate process from electrical energy storage devices. These difficulties have been overcome by the techniques described below.

SUMMARY OF THE INVENTION

Described is an electrochemical technique for activating carbonaceous electrodes. "Activating" is a process of decreasing the overvoltage of electrodes in an electrochemical reaction. By "overvoltage" is meant the difference between the voltage necessary to sustain an electrochemical reaction and the open circuit voltage. The invention is further described as a method of activating carbonaceous electrodes comprising the steps:

1. Providing a negative electrode and a carbonaceous positive electrode spaced apart from each other;
2. Providing an aqueous electrolyte with a current carrying water soluble material therein; and
3. Closing the circuit and passing a current between the positive and negative electrodes through the electrolyte thereby generating oxygen for a period of time sufficient to activate the positive electrode, i.e., an effective activating period of time.

BRIEF DESCRIPTION OF THE DRAWINGS

FIG. 1 is a diagrammatic view of the process of the present invention;

FIG. 2 is a sectional view of a submodule of assembled electrolytic cells;

FIG. 3 is a case for supporting a submodule stack of electrolytic cells useful in the process of the present invention;

FIG. 4 is a sectional view along lines 4—4 of FIG. 2;

FIG. 5 is a sectional view taken along lines 5—5 of FIG. 4;

DETAILED DESCRIPTION OF INVENTION

Figure 6:
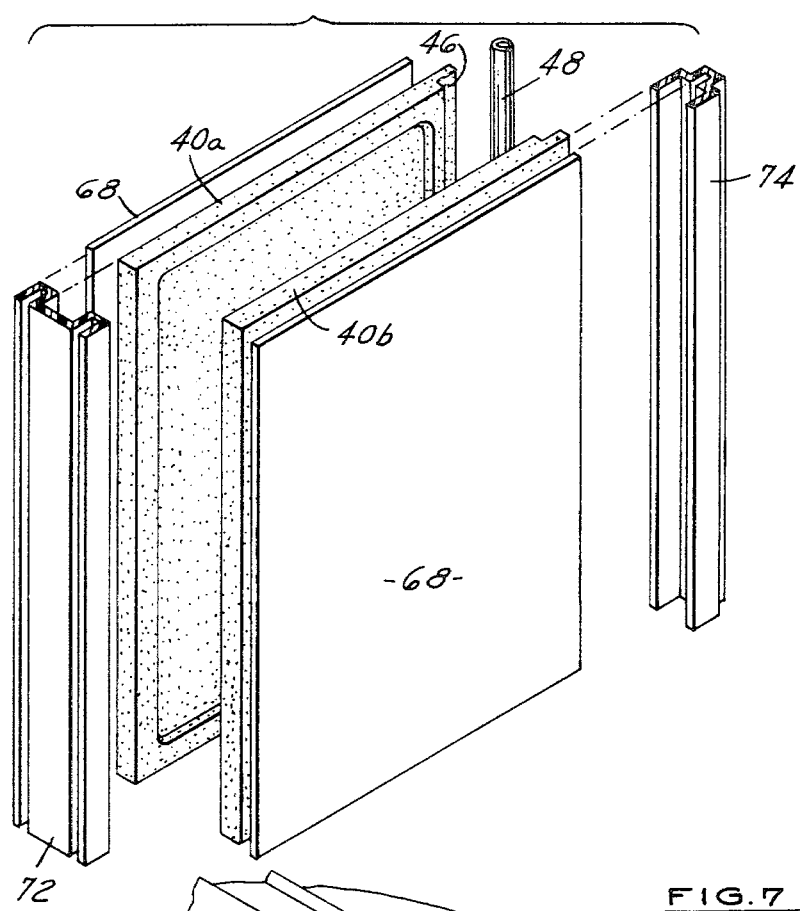
FIG. 6 is an exploded view of the electrodes useful in the process of the present invention.
Figure 7:
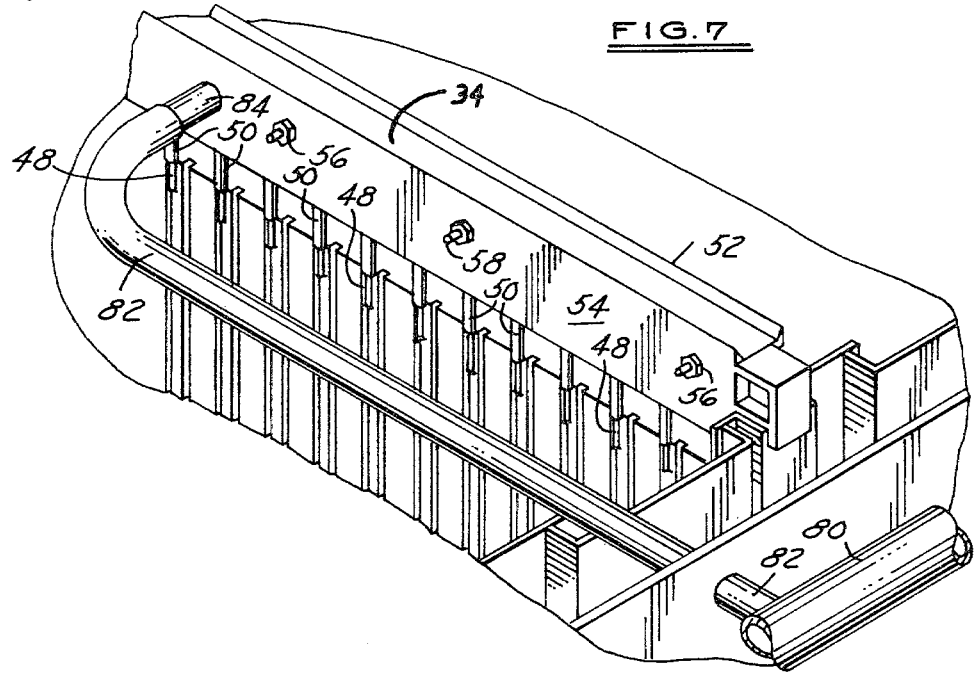
FIG. 7 is a sectional view of the cell distribution manifold useful in the process of the present invention.

The present invention is concerned with a method for activating carbonaceous electrode that are useful in electrochemical operations. By "carbonaceous electrodes" is meant electrodes that are comprised of carbon, such as carbon, activated carbon, graphite, activated graphite and mixtures thereof with other fillers that may be present in a carbonaceous electrode.

The electrodes resulting from the activating process of the present invention are useful in a variety of electrochemical processes wherein an activated electrode would be desirable. Such processes would be electrochemical generation or use of hydrogen, oxygen, halogen, such as chlorine, bromine, fluorine, iodine, oxides of halogen, as chlorates, bromates, iodates, primary or secondary fuel cells, such as the metal hydride type, or other electrical energy storage devices, such as the metal halogen rechargeable EESD. Most preferred is the EESD of the metal halogen hydrate type, such as the zinc halogen device described in U.S. Pat. No. 3,713,888 or U.S. Pat. No. 4,049,880, which are hereby incorporated by reference. Operations of zinc chloride battery systems are described in Electric Power Research Institute (EPRI) EM-249 Report for Project 226-1, Interim Report, September 1976; EM1051, Parts 1-4, Project 226-3, Interim Report, April 1979; Cost Analysis of 50 KWH Zinc-Chlorine Batteries for Mobile Applications, U.S. Department of Energy Report COO-2966-1, January 1978 and Safety and Environmental Aspects of Zinc-Chlorine Hydrate Batteries for Electric Applications, U.S. Department of Energy Report COO-2966-2, March 1978, herein incorporated by reference.

It has been found highly desirable that the carbonaceous electrodes can be activated by subjecting them to an electrolysis reaction wherein the carbonaceous electrode is the positive electrode in an electrical circuit and there is also present a negative electrode with an aqueous electrolyte therebetween. The aqueous electrolyte contains a current carrying water soluble material. While any ionizable water soluble material may be employed, such as organic or inorganic materials, the most preferred are inorganic materials. Suitable examples of inorganic materials are salts of oxides of nitrogen, such as nitric acid, alkali and alkaline earth metal nitrates, such as sodium or potassium nitrate and the like, halogen salts, such as chloride, bromide, iodide, fluoride salts of alkali or alkaline earth metals, such as sodium chloride, potassium chloride, magnesium bromide, barium chloride, as well as the oxygenated form of said halide salts, such as the chlorates, bromates, iodates, and the like, halide acids, such as hydrochloric acid, hydrofluoric acid, hydrobromic acid, hydroiodic acid and the like, oxides of sulfur, such as the sulfates, sulfites, sulfonates and the alkali metal or alkaline earth metal salts thereof, phosphates such as phosphoric acid, sodium phosphate, borates such as boric acid, sodium borate, potassium metaborate; carboxylic acid salts, as sodium acetate, potassium oxalate, sodium succinate and the like and non-reactive mixtures thereof. Most preferred of the above enumerated salts are the metal halides, such as zinc chloride, hydrochloric acid and sodium sulfate, with the most preferred being hydrochloric acid optionally including zinc chloride.

It has been found highly desirable to achieve the desired activation that the electrolysis reaction be performed for a period of time such that the electrode is subjected to electrolysis corresponding to at least 5 milliamp hours (mAh) per square centimeter ($cm^2$) of electrode surface area. This is called a minimum degree of activation. While the maximum degree of activation is quite high, it is desirable that for a practical degree of activation the maximum activation is about 1000 mAh/cm$^2$ of electrode surface, more preferably about 715 mAh/cm$^2$. Most preferred activation is from about 30 to about 350 mAh/cm$^2$.

During the electrolysis reaction, i.e., the imposition of a current density, oxygen and hydrogen are generated at the appropriate electrodes as well as oxides of carbon, such as carbon dioxide and carbon monoxide. Generation of the oxides of carbon are indicative of corrosion or degradation of the internal electrode surfaces, thereby increasing the surface area and modifying the pore size of the electrodes.

An indication as to the amount of activation that has been obtained is the amount of oxides of carbon that are generated during the electrolysis reaction. To obtain the most desirable activation, the electrolysis reaction is to be conducted for a period of time sufficient to generate the gaseous oxides of carbon, preferably, between 0.1 and 30% by volume of oxides of carbon, most preferably, about 10 to about 25% of oxides of carbon, in a gaseous sample taken after 5 mAh/cm$^2$ of electrolysis at the electrode surface.

When a zinc halide is employed as the current carrying salt in the aqueous electrolyte, it is preferred that the initial (prior to imposition of a current) pH range from about 1 to about 3, most preferably, at about 2. With HCl the initial pH is about 1. With NaCl or KCl, optionally including Na$_2$So$_4$, the pH is about 7. In addition, when a halide is used, such as zinc chloride, the initial (prior to imposition of a current) concentration of the electrolyte is about 0.1 to about 5% by weight of the zinc chloride in water. A preferred range is 1% by weight zinc chloride in water (0.075 molar ZnCl$_2$ or 0.15 molar chloride) to 5% by weight zinc chloride in water (0.38 molar ZnCl$_2$ or 0.76 molar chloride).

Turning now to a discussion of the drawings, FIG. 1 is a schematic diagram of the operation of the device for activating the electrodes. In a container 10 sealed or unsealed, is placed an electrolyte reservoir 12 within a plastic reservoir 14. The electrolyte reservoir 12 functions as a sump from which electrolyte is pumped via line 16 by means of pump P into each of the stacks or submodules 18 via independent conduits 20. A valve V is placed in the line 16 so that the electrolyte may be changed or dumped as desired. The processing apparatus 10 is shown as containing a hood 22 from which the vapors are vented or treated in an environmental and economical manner. If desired, the hood could be sealed at 24 in order to operate a closed system to increase pressure or decrease pressure in the apparatus 10 as is desired. It is to be appreciated that the electrolyte that is flowing from the sump 12 via line 16 into the submodules 18 can be heated or cooled as is desired by auxiliary apparatus (not shown).

FIG. 2 is a cross-section of the electrochemical apparatus of the present invention showing the electrolyte sump 12 being retained in a tray 22 and a series of electrical cells arranged in bipolar fashion having current terminals 19 and 21. The current is passed through the current terminals to conventional bus bars which in turn are connected to connector studs (not shown), thereby passing the current to each of the individual cells in each submodule. Each stack of electrodes is retained in a submodule tray 22, a sectional view of which is shown in FIG. 3. The submodule tray has an electrolyte drain cut 24 to which is attached a conduit 26 which in turn is connected to a passageway for movement of electrolyte away from the submodule to the sump via exit line 28. In order to prevent parasitic losses during the charging of the stack, and to decrease the short circuiting that could possibly occur, the electrolyte passes down the conduit 26 through a pair of opposed serpentine like channels, best shown in FIG. 3 as channel 30 and 32 respectively with flow in the direction of the arrows.

The most preferred embodiment is that an electrolyte is flowing past the electrodes during the electrolytic activating reaction. To provide for the flowing electrolyte, an electrolyte distribution manifold 34 is provided for each submodule. The electrolyte flows from the sump 12 out exit port 36 and is pumped back to the submodule.

A sectional view showing a portion of a stack of electrodes with the porous carbonaceous electrode, which, in the most preferred embodiment, is the chlorine electrode of a zinc chlorine electrical energy storage device, is shown in FIG. 4. The submodule, which is a stack 18 of ten cells is inserted into the interior 35 of the submodule tray 22 wherein the electrolyte distribution manifold 34 would be joined with the submodule tray by positioning the manifold into channels 38.

It is to be appreciated that the electrodes or submodules could be combined in series or parallel relationship as is well known in the art.

The porous chlorine electrode 40 is arranged such that a pair of porous carbon plates 40a and 40b are joined together forming a cavity 41 to allow passage of electrolyte therethrough as shown by arrows 42. Gas venting holes (not shown) may be provided at the top of the porous chlorine electrode. To prevent distortion of the porous chlorine electrodes, stub 44 is present in the middle of the chlorine electrode to give strength thereto. The porous chlorine electrodes are manufactured to have an intended portion 46, in which the electrolyte feed tube 48 may be inserted. The electrolyte feed tube in turn is connected to the internal electrolyte distribution manifold at point 50. The electrolyte distribution manifold is comprised of a pair of complementary members 52 and 54 which are fastened together by nuts 56 and bolts 58.

A bipolar intermediate bus 60 is machined to receive the chlorine electrodes at points 62 and 64, while adjacent thereto is the metal or zinc electrode 68 which fits into the intermediate bipolar bus at point 70. To prevent short circuiting, to insure tight fit, to control discharge rates of chlorine electrode, and to control the edge effects thereof, spacers 72 ad 74 join together the chlorine and zinc electrodes which are arranged in bipolar fashion. For a more complete description of controlling the chlorine electrode, see Ser. No. 062,109 filed July 30, 1979 entitled *CONTROL OF EDGE EFFECTS OF OXIDANT ELECTRODES*, filed on even date herewith, hereby incorporated by reference.

In operation the electrolyte is flowed from the sump 12 through external manifold 80 into interior manifold 82 which is a conduit which is connected to the electrolyte distribution manifold at point 84. From the electrolyte distribution manifold, the electrolyte is passed through tubes 48 whereby the electrolyte exits from the tube at the bottom of the halogen electrode at point 83 and the electrolyte flows through the porous electrodes up the intercell spacing 84 into drain cup 24 down the exit conduit 26, into channels 30 and 32 as described above and out the exit 28 back to the sump.

The separation between the porous positive electrode and the negative electrode ranges from about 40 mils (1 mm) to about 250 mils (6 mm), preferably 80 mils (2 mm).

It is to be appreciated that the operation of the method of the present invention as it relates to activating carbonaceous electrodes may be performed in a manner such that one or more electrodes may be activated simultaneously. For convenience, the drawings are directed towards the most preferred technique, which is the activation of a stack of electrodes that are interdigitated, such as that described in U.S. Pat. No. 4,100,332, herein incorporated by reference. It is to be appreciated that the activation of carbonaceous electrodes may be performed in any individual electrolytic cell containing positive and negative electrodes or a stack of same. The most preferred technique is to utilize the electrochemical activating process of the present invention on the final form of electrodes as they are going to be employed in an electrical energy storage device such as the metal halogen hydrate battery described in U.S. Pat. No. 3,718,888, described above. When following that procedure, the electrodes are assembled into the stack or submodule as is shown in the drawings. Thereafter, the halogen hydrate formation apparatus (25) necessary for forming and storing the halogen hydrate during the charging and discharging of the electrical energy storage device is assembled to the apparatus useful in this invention via line 23. Any conventional halogen hydrate formation and storage equipment may be used such as that described in U.S. Pat. Nos. 3,713,888; 3,823,036, or Electric Power Research Institute reports and U. S. Department of Energy reports discussed supra.

Therefore, prior to the charging of said metal halogen electrical energy storage device, the electrode stack would be subjected to an activating procedure using the electrolyte as described above. Thereafter, the electrolyte may or may not be removed from the sump depending upon the desired end use of the electrical energy storage device. Most preferably, however, the electrolyte utilized in the activation step would be removed such as through drain 17 and then the new electrolyte introduced, which would be the electrolyte used during the charging and discharging operation of the electrical energy storage device. The steps most preferred are as follows:

1. Activating the positive electrodes of an electrical energy storage device;
2. Assembling the activated electrodes into a metal halogen electrical energy storage device;
3. Then charging the electrical energy storage device; and
4. Discharging the electrical energy storage device.

Currently contemplated is that after the activation process of Step 1, one then holds the electrode stack until needed, i.e., building up an inventory of the stacks. During the activation process when zinc chloride is the electrolyte, zinc may be deposited on the negative electrode. It is desirable to remove that zinc prior to assembling the stack into the desired EESD. It is also to be appreciated that during Step 3 would be the deposition of metal on the negative electrode and the formation of a halogen hydrate or other means of storing the halogen generated during the charging operation.

Having described the invention in general, listed below are preferred embodiments wherein all temperatures are in degrees Centigrade and all parts are parts by weight unless otherwise indicated.

EXAMPLE 1

A submodule containing ten stacks of electrodes in series as shown in FIG. 2 was electrolytically activated using dilute ($\sim 1\%$ by weight) zinc chloride in water whose pH had been adjusted to $\sim 2$. The initial chloride ion concentration was determined to be 0.18 M; an electrolyte volume of 60 liter was employed. Electrolytic processing was performed at a current density of 30 mA/cm$^2$ for a period of 5 hours, the extent of processing therefore being 150 mAh/cm$^2$. The electrolyte flow rate during processing was maintained at 2 ml/cm$^2$/min. Over the processing period it was observed that: the temperature rose from 16° C. (initial) to 40° C. (after 4 hours). During the last hour, a temperature $<40°$ C. was maintained. The voltage dropped steadily from its initial value of 31.62 V to as low as 29.20 V.

An analysis (by gas chromatography) of the gases produced verified that anode corrosion was taking place:

| | |
|---|---|
| Hydrogen | 69% by volume |
| Oxygen | 12% by volume |
| Carbon Monoxide | 3% by volume |
| Carbon dioxide | 16% by volume |

During the 5 hour processing period gas phase composition did vary, however, the above analytical values are cited as typical of that found during the last three hours.

After electrolytic processing, the bath was discarded. The battery was rinsed with distilled water (circulated with system pump).

The voltaic performance of the activated battery unit is shown in Table I A and B. For comparison purposes, the performance of a (similar) battery which had not been processed, i.e., in the unactivated state, is also presented. Test conditions employed were:

Electrolyte: 26% by weight ZnCl$_2$ (SpG 1.275), pH adjusted to 0.05 with HCl.

Electrolyte flow rate (charge and discharge) 2 ml/cm$^2$/min

Chlorine concentration (dissolved in electrolyte) while discharging: approximately saturated Temperature, Charge: 22°–30° C. Discharge: 24°–28° C.

TABLE I-A

| Performance Of Battery In Unactivated State | | | |
|---|---|---|---|
| Charge | | Discharge | |
| Current Density (mA/cm$^2$ of electrode surface) | V* | Current Density (mA/cm$^2$ of electrode surface) | V* |
| 10 | 2.286 | 10 | 1.901 |
| 20 | 2.368 | 20 | 1.789 |
| 30 | 2.435 | 30 | 1.705 |
| 40 | 2.487 | 40 | 1.630 |
| 50 | 2.528 | 50 | 1.560 |
| 60 | 2.562 | 60 | 1.494 |

*Values are in volts/cell; submodule battery voltage is 10 times this value.

TABLE I-B

Performance of Battery After Electrolytic Activation

| Charge | | Discharge | |
| --- | --- | --- | --- |
| Current Density (mA/cm² of electrode surface) | V* | Current Density (mA/cm² of electrode surface) | V* |
| 10 | 2.185 | 10 | 2.096 |
| 20 | 2.232 | 20 | 2.057 |
| 30 | 2.272 | 30 | 2.016 |
| 40 | 2.308 | 40 | 1.970 |
| 50 | 2.342 | 50 | 1.919 |
| 60 | 2.374 | 60 | 1.868 |

*Values are in volts/cell; submodule battery voltage is 10 times this value.

EXAMPLE 2

A single cell test stand was fabricated having a porous positive (chlorine) electrode (10 cm × 10 cm) and a graphite negative (zinc) electrode (10 cm × 10 cm). Electrolyte was supplied by a manifolding arrangement such that it passed through the porous electrode, between the inter cell spacing and out the top of the negative electrode. The cell assembly was held together by a clamping arrangement and then placed in a glass jar which served as the electrolyte sump.

To demonstrate the relationship between the activation of the chlorine (positive) electrode and its increased efficiency when following the process of the present invention, the test cell was subjected to a series of activation tests. The activation electrolyte was the same as Example 1. No attempt was made to control temperature. Two liters of electrolyte was employed.

Figure 8:
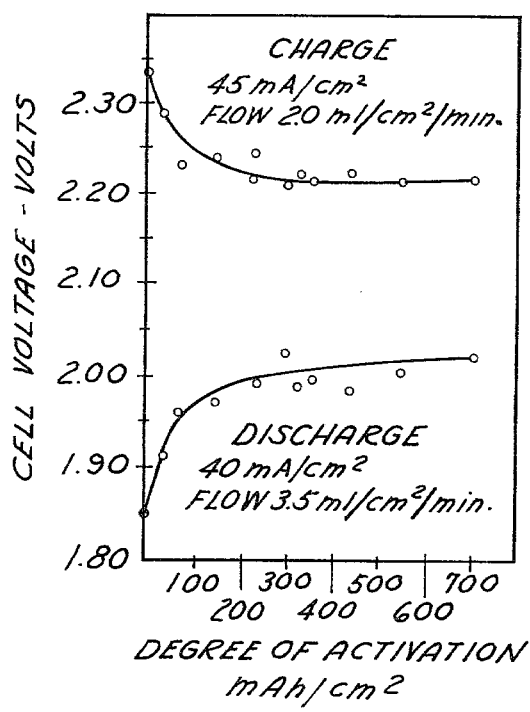
FIG. 8 is a graph plotting cell voltage against the degree of activation plotted on a charge and discharge phase.
Figure 9:
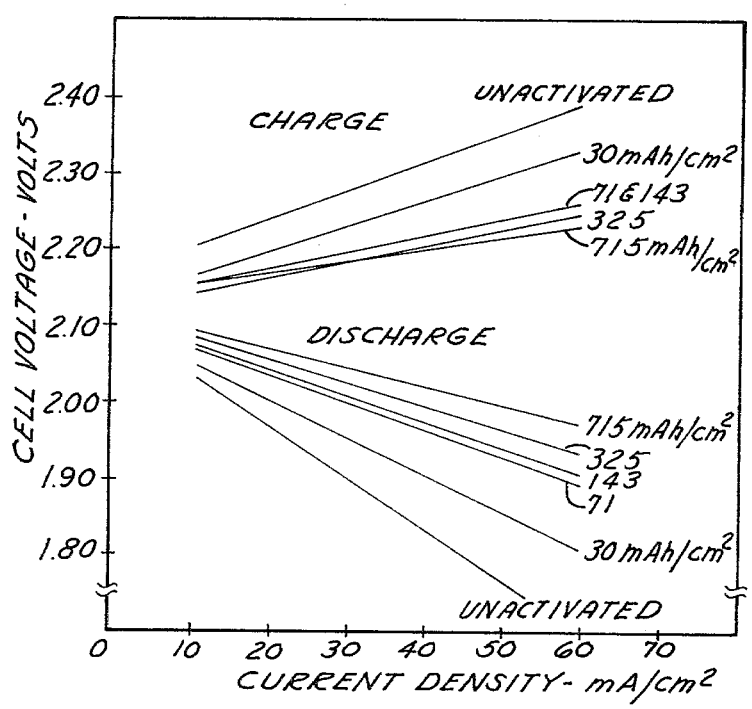
FIG. 9 is a graph plotting cell voltage against current density on a charge and discharge phase comparing electrodes that have been unactivated versus activated for various current densities.

To determine the voltaic performance of the cell (charge and discharge), an aqueous electrolyte was formulated of 2 M $ZnCl_2$ + 5 M KCl having a pH of 0.2 (adjusted with HCl). During charge the chlorine generated was vented. It is to be appreciated that any conventional technique for forming chlorine hydrate could have been employed. During discharge, chlorine from a cylinder was passed into the electrolyte to maintain a saturated dissolved chlorine level. The temperature was about 50° C. with an electrolyte flow rate during charge of 2 ml/cm²/min and on discharge of 3.5 ml/cm²/min. The test cell was rinsed with water after electrolytic activation and prior to charging. The test results are graphically shown in FIGS. 8 and 9.

EXAMPLE 3

Following the procedure and apparatus of Example 2, electrolytic activation baths other than zinc chloride were tested. Selected electrolytes are shown in Table II.

TABLE II

| Experiment | Bath Composition | Initial pH | Current Density (mA/cm² trolyzed) | Hours Electrolyzed (mAh/cm²) | Extent Processed |
| --- | --- | --- | --- | --- | --- |
| A | HCl, 0.1M | 0.7 | 30 | 5 | 150 |
| B | NaCl, 0.2M | 2 | 6.5 | 11 | 71.5 |
| C | Na₂SO₄, 0.2M | 2 | 6.5 | 11 | 71.5 |

Voltaic performance and polarization characteristics are shown in Tables III A–C.

TABLE III-A

Performance After HCl Activation*

| Current Density (mA/cm²) | Charge Volts (V) | Discharge Volts (V) |
| --- | --- | --- |
| 10 | 2.153 | 2.088 |
| 20 | 2.172 | 2.064 |
| 30 | 2.191 | 2.028 |
| 40 | 2.209 | 1.993 |
| 45 | 2.217 | — |
| 50 | 2.226 | 1.958 |
| 60 | 2.241 | 1.924 |
| 70 | 2.256 | 1.887 |
| 80 | 2.270 | 1.810 |
| 90 | 2.283 | 1.768 |
| 100 | 2.296 | — |

*Electrolytic conditions for charge and discharge: electrolyte: 2M $ZnCl_2$, 5M KCl temperature was about 50° C. electrolyte flow rate of 2 ml/cm² of electrode surface/min

TABLE III-B

Performance After NaCl Activation*

| Current Density (mA/cm²) | Charge Volts (V) | Discharge Volts (V) |
| --- | --- | --- |
| 10 | 2.133 | 2.074 |
| 20 | 2.161 | 2.043 |
| 25 | 2.176 | 2.026 |
| 30 | 2.190 | 2.009 |
| 40 | 2.215 | 1.972 |
| 45 | 2.227 | 1.952 |
| 50 | 2.239 | 1.930 |
| 60 | 2.261 | 1.880 |

*Electrolytic conditions for charge and discharge: same as Table III-A except flow rate was ⅜ ml/cm² of electrode surface/min.

TABLE III-C

Performance After Na₂SO₄ Activation*

| Current Density (mA/cm²) | Charge Volts (V) | Discharge Volts (V) |
| --- | --- | --- |
| 10 | 2.127 | 2.071 |
| 20 | 2.161 | 2.043 |
| 25 | 2.176 | 2.027 |
| 30 | 2.189 | 2.010 |
| 40 | 2.212 | 1.976 |
| 45 | 2.223 | 1.958 |
| 50 | 2.234 | 1.940 |
| 60 | 2.255 | 1.899 |

*Electrolytic conditions for charge and discharge: same as Table III-A.

In the working examples described above, a porous (PG-60 type) graphite electrode was employed as the chlorine electrode while the metal or zinc electrode was ATJ or EBP graphite which is of a nonporous type. The porous electrode is available from the trade as a PG-60 type. The electrodes had a surface area of 62.5 square centimeters and the plastic materials are substantially made of KYNAR (trademark of Pennwalt Corp. for a homopolymer of the vinylidene fluoride type). It is to be appreciated that the activation time employing the electrolytic process as described herein is substantially faster than the thermal process employing nitric acid as described above in U.S. Ser. No. 761,722, filed Jan. 24, 1977, now U.S. Pat. No. 4,120,774.

It is to be appreciated therefore that for desirable activation that the amount of oxides of carbon that should be produced can range from as low as 0.1 to about 30% by volume of the gases produced during the activation process, preferably 10% to 25%. While substantially higher percentages of gases may be produced resulting in activation of electrodes, weakening of the electrodes can easily result since oxides of carbon is an indication of degradation of electrodes.

While Applicants do not wish to be held to any theory, it appears that there is an activated surface that occurs due to the electrochemical operation. It is believed that the electrode surface area (square meter per gram of electrode surface) is increased by virtue of the electrolytic reaction from 0.6 (nonactivated) to 9, preferably about 2 to about 5, and even more preferably, about 2–3 (square meters per gram).

While it is believed that the electrolytic activation described herein results in permanent improvements to the electrode, the activation process may be conveniently performed any number of times after initial use to increase activity (decrease electrode overvoltage) of the electrode.

What is claimed is:

1. A method for activating a carbonaceous electrode comprising the steps;
   1. Providing a negative electrode and a carbonaceous positive electrode spaced apart from each other;
   2. Providing an aqueous electrolyte with a current carrying water soluble material therein; and
   3. Closing the circuit and passing a current between the positive and negative electrodes through the electrolyte thereby generating oxygen for a period of time sufficient to activate the positive electrode, wherein the current is passed for a period of time from about 5 mAh/cm$^2$ to about 1000 mAh/cm$^2$ of electrode surface of the positive electrode and a sample of gas generated during said period of time contains gaseous oxides of carbon in amount of 0.5% to 30% by volume.

2. The method of claim 1 wherein the electrolyte is a metal halide aqueous electrolyte.

3. The method of claim 2 wherein the metal halide has a concentration of at least 0.1% by weight.

4. The method of claim 3 wherein the metal halide is zinc chloride.

5. The carbon electrode produced by the process of claim 4.

6. The method of claim 1 wherein the electrolyte is comprised of hydrochloric acid.

7. The carbon electrode produced by the process of claim 6.

8. The carbon electrode produced by the process of claim 1.

9. The process of claim 1 wherein the amount of oxides of carbon ranges from about 10 to about 25%.

10. In a method of operating an electrical energy storage device employing carbonaceous positive electrodes wherein the device is electrically charged and discharged, the improvement comprising the steps of;
    1. Prior to charging the device, activating the positive electrode by providing an aqueous electrolyte with a current carrying water soluble material therein; and
    2. Closing the circuit and passing a current between the positive and negative electrodes through the electrolyte thereby generating oxygen for a period of time sufficient to activate the positive electrode, wherein the current is passed for a period of time from about 5 mAh/cm$^2$ to about 1000 mAh/cm$^2$ of electrode surface of the positive electrode and a sample of gas generated during said period of time contains gaseous oxides of carbon in amount of 0.5% to 30% by volume.

11. The method of claim 10 wherein the electrolyte is a metal halide aqueous electrolyte.

12. The method of claim 11 wherein the metal halide has a concentration of at least 0.1% by weight.

13. The method of claim 12 wherein the metal halide is zinc chloride.

14. The method of claim 10 wherein the electrolyte is comprised of hydrochloric acid.

15. The method of claim 14 wherein the electrical energy storage device is a rechargeable metal halogen device.

16. The method of claim 15 wherein the metal halogen device is a metal halogen hydrate device.

17. The method of claim 16 wherein the device is a zinc chlorine chlorine hydrate device.

18. The process of claim 10 wherein the amount of oxides of carbon ranges from about 10 to about 25%.

19. The method of claim 10 wherein after the activation process is performed, removing the electrolyte and inserting new electrolyte prior to using the electrodes in the electric energy storage device.

* * * * *